Jan. 3, 1950  W. C. EDDY  2,493,237
KALEIDOSCOPIC IMAGE PROJECTION DEVICE
Filed Feb. 22, 1945
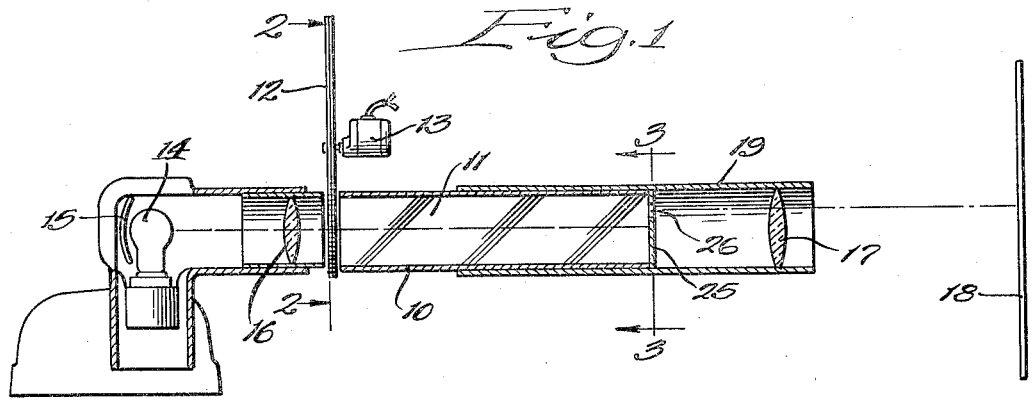
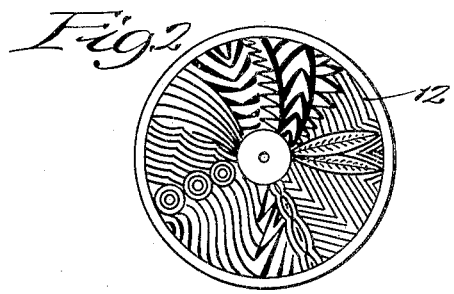
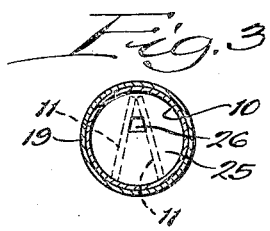
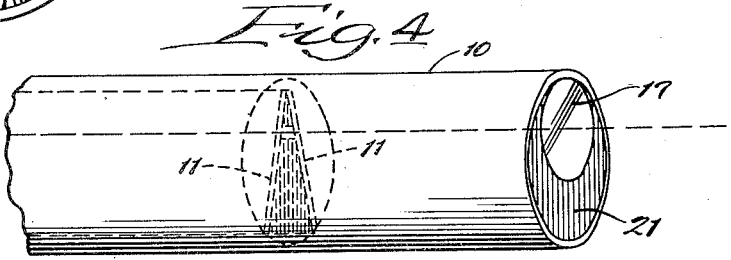
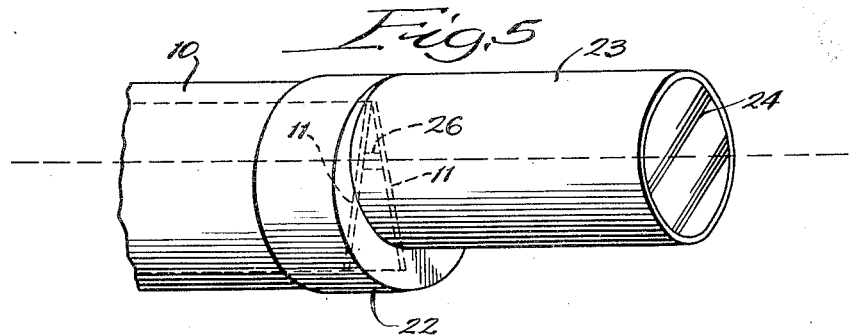
Inventor:
William C. Eddy,
By Dawson, Ooms & Booth
Attorneys.

Patented Jan. 3, 1950

2,493,237

UNITED STATES PATENT OFFICE 2,493,237

KALEIDOSCOPIC IMAGE PROJECTION DEVICE

William C. Eddy, Michigan City, Ind., assignor to Television Associates, Inc., Chicago, Ill., a corporation of Illinois Application February 22, 1945, Serial No. 579,209

5 Claims. (Cl. 88—24)

This invention relates to kaleidoscopic projection devices and more particularly to apparatus for projecting kaleidoscopic images on receiving screens such, for example, as the screens of television transmitting tubes.

In previous attempts to project kaleidoscopic images two major difficulties have been encountered: (1) a portion of the image tends to be improperly focused producing fuzziness and (2) that the light intensity is not uniform throughout the image. The fuzziness is believed to be caused by the tendency of the light beams to climb from one of the angularly positioned mirrors to the other so that by the time the beams are collected in an objective or focusing lens that portion of the beams which issues from the separated edges of the mirrors cannot properly be focused by the lens. Furthermore, when the lens is concentric with the mirrors I have found that the image is not concentric with the lens and the portion of the lens opposite the separated edges of the mirrors causes a light deflection tending toward fuzziness.

Unbalance of the light intensity in the image is believed to be caused by certain of the beams of light which travel through the angularly related mirrors adjacent the apex thereof with a minimum amount of reflection. The portion of the image produced by such beams of light tends to be more intense than other portions of the image produced wholly by reflected light.

It is one of the objects of the present invention to provide a kaleidoscopic projection device in which indistinctness or fuzziness in the image is eliminated and in which the light intensity throughout the entire image is substantially balanced.

Another object of the invention is to provide a kaleidoscopic projection device in which that portion of the light beams projected adjacent the spaced parts of the mirrors is blocked so that fuzziness in the image is eliminated.

Still another object is to provide a kaleidoscopic projection device in which beams of light tending to pass between the mirrors adjacent the apex thereof with a minimum of reflection are blocked so that the light balance throughout the image is substantially uniform.

A specific object is to provide a shielding means in a kaleidoscopic projection device which limits the beams of light producing an image to a relatively small space between the opposite edges of the mirrors. With a construction of this kind, the light beams which produce fuzziness in the image and the light beams which create greater intensity in certain portions of the image are blocked so that a sharp image of uniform intensity is produced.

A further object of the invention is to provide a kaleidoscopic projection device in which a focusing lens is so arranged that its effective area is substantially centered about an axis concentric with the useful portion of the image reflected from the mirrors. To accomplish this result a lens concentric with the mirror mounting may be employed which is shielded throughout the portion thereof opposite the spaced edges of the mirrors or a fully open lens concentric with an axis parallel to the meeting edges of the mirrors and spaced closer to the meeting edges than the spaced edges of the mirrors may be used.

A still further object is to provide a kaleidoscopic projection device in which a kaleidoscopic image is produced by a translucent disc rotatable adjacent one end of a housing in which angularly related mirrors are mounted.

The above and other objects and advantages of the invention will be more readily apparent from the following description when read in connection with the accompanying drawing, in which—

Figure 1 is a diagrammatic sectional view of a kaleidoscopic projection device embodying the invention;

Figure 2 is an elevation of the kaleidoscopic disc on the line 2—2 of Figure 1;

Figure 3 is a partial section illustrating the shielding means on the line 3—3 of Figure 1;

Figure 4 is a partial perspective view illustrating shielding of the focusing lens; and Figure 5 is a view similar to Figure 4 illustrating an alternative focusing lens arrangement.

The apparatus, as shown, comprises an elongated tubular housing 10 in which a pair of mirrors 11 with one edge meeting at an angle.

The angle at which the mirrors 11 are arranged can be adjusted or designed to produce any desired number of kaleidoscopic segments as is understood in the art. As shown, the mirrors meet at an angle of approximately 20° to produce 18 segments in the complete image although any desired angle to produce any desired number of segments might be employed.

An image is adapted to be projected into one end of the housing 10 and into one end of the mirrors through a transparent disc 12 which is rotatably mounted adjacent one end of the housing to be driven by a motor 13. The disc 12 may be formed as shown in Figure 2 with any desired pattern arrangement to produce any desired type of image either in black and white or in colors. Conveniently the disc is made of a translucent photographic plate cemented to a sheet of clear glass to protect the emulsion on the plate although discs of various other types might be used, if desired. Light is projected through the disc into the housing and mirrors from a light source indicated at 14 mounted adjacent a reflector 15 through a lens 16.

The light coming from the opposite end of the mirrors is collected by a lens system indicated as a simple double convex lens 17 and is projected on a screen shown at 18. It has been found with an apparatus as so far described and with the mirrors arranged with their apex or meeting edges at the top as indicated in Figure 3 that the upper half of the image is sharp and bright while the lower half is fuzzy and substantially dimmer than the upper half. This is believed to be due to the fact that the light beams forming the lower portion of the image come to a large extent from the portions of the mirrors 11 adjacent the separated edges thereof. The light beams coming from this portion of the mirrors have been reflected to the maximum extent and strike the lens 17 at widely varying angles so that they are not all sharply focused by the lens. The brightness occuring in the upper half of the image is believed to be due to those light beams which pass directly through the mirror system adjacent the apex of the mirrors with a minimum amount of reflection. Since the beams which are reflected to a large extent tend to distribute themselves more or less evenly over the image and since those which are reflectd to a minimum extent tend to concentrate themselves in the upper portion of the image after passing through the lens 17, the upper portion of the image tends to have a greater light intensity than the lower portion thereof.

In order to eliminate the fuzziness in the lower portion of the image, I have found that the end of the mirrors adjacent the screen should be shielded throughout an area extending from the spaced mirror edges toward the apex of the mirrors and to a point past the center point between the mirror edges. When this area of the mirror opening is shielded, those rays which have been reflected to the maximum extent and which have tended to move toward the spaced edges of the mirrors are largely blocked out so that the rays which are effective in producing the image must issue from the open end of the mirrors adjacent the apex thereof. With this shielding the fuzziness normally occuring in the lower half of the image is eliminated without reducing the size of the projected image as would occur if mirrors of less width were employed.

Further to reduce the fuzziness in the image, the lens 17 may be shielded as indicated particularly in Figure 4. As shown, the lens 17 is carried by a separate tube 19 slidable on the housing 10 to provide focusing for screens spaced different distances from the housing. As shown in Figure 4, an opaque screen 21 is mounted adjacent the lens 17 to block off that portion of the lens opposite the spaced edges of the mirrors to leave an opening through the lens which is substantially symmetrical about an axis parallel to the mirrors and spaced from the apex thereof a distance substantially equal to one-third of the width of the mirrors. I have found that the major effective portion of the image is centered about this axis and by limiting the effective area of the focusing lens to an opening symmetrical about this axis, stray rays which tend to be diffused by the outer portions of the lens are eliminated so that the image is sharpened.

An alternative method of producing the same effect in the focusing lens is illustrated in Figure 5. As shown in this construction, a sleeve 22 is secured over the end of the housing 10 and carries an extension tube 23 eccentric to the axis of the housing in which a focusing lens 24 is mounted. The extension 23 is concentric with an axis parallel to the mirrors and spaced from the apex of the mirrors a distance equal to substantially one-third of the mirror width so that the center of the lens 24 is concentric with the effective axis of the projected image. It will be seen that this construction is substantially identical with that of Figure 4 so far as the focusing lens is concerned except that in Figure 5 the full sectional area of the relatively smaller focusing lens 24 is utilized.

In order to balance the light intensity throughout the full image, the portion of the space between the mirrors closely adjacent the apex of the mirrors is shielded. Shielding at this point blocks out those light beams which tend to travel between the mirrors closely adjacent their apex without substantial reflection so that all of the beams which come from the mirror system are reflected to a substantially equal extent to produce a substantially equal light intensity throughout the projected image.

The two types of shielding referred to above may conveniently be produced by a single shielding disc indicated at 25 mounted adjacent the end of the housing 10 and adjacent the object ends of the mirrors 11. The disc is formed of any desired opaque substance which is solid throughout except for a relatively small truncated triangular opening 26 registering with the space between the mirrors at a distance substantially one-third of the mirror width from the apex thereof. As best seen in Figure 3, the opening 26 extends from one mirror to the other and has its center spaced from the apex of the mirrors and from a line connecting the spaced edges of the mirrors. With a shield of this type, light beams reflected from the mirrors adjacent the spaced edges thereof are blocked as are those light beams which tend to travel between the mirrors adjacent their apex without substantial reflection. A single shield as defined, therefore, performs the two shielding operations fully described above although it will be apparent that separate shields located in different parts of the housing could be used, if desired.

With the apparatus, as described above, an image which is sharply focused throughout will be projected on the screen 18 and the light intensity of the image will be substantially balanced in all portions thereof. It will be understood that the screen 18 might be a viewing screen of any desired type or might be the receiving screen of a transmitting tube in a television apparatus.

While one embodiment of the invention has been shown and described in detail, it will be understood that this embodiment is illustrative only and is not intended as a definition of the scope of the invention, reference being had for this purpose to the appended claims.

What is claimed is:

1. A kaleidoscopic projection device comprising an elongated tubular housing, a pair of elongated mirrors in the housing meeting at an angle at one edge, means to project an image into the one end of the mirrors, and shielding means adjacent the other ends of the mirrors defining an aperture of small linear dimensions relative to the width of said mirrors and located between said mirrors at a point closer to the meeting edges of said mirrors than to the spaced edges thereof, said aperture being bounded by the faces of said mirrors and by two straight lines substantially perpendicular to the bisector of the angle defined by said mirrors and spaced from said meeting edges.

2. A kaleidoscopic projection device comprising an elongated tubular housing, a pair of elongated mirrors in the housing meeting at an angle at one edge, means to project an image into one end of the mirrors, a shield adjacent the other end of the mirrors closing the space in front of said other end except for a relatively small space closer to the meeting edges of the mirrors than to their spaced edges, a tubular extension on the housing, and a focusing lens in the extension having an effective lens opening substantially symmetrical about an axis parallel to the mirrors and concentric with said space.

3. A kaleidoscopic projection device comprising an elongated tubular housing, a pair of elongated mirrors in the housing meeting at an angle at one edge, a translucent pattern disc rotatably mounted to overlie one end of the housing, a light source to project a light beam through the pattern, and shielding means adjacent the other end of the housing to close the space in front of the mirrors from the spaced edges thereof to a point spaced from the meeting edges thereof.

4. A kaleidoscopic projection device comprising an elongated tubular housing, a pair of elongated mirrors in the housing meeting at an angle at one edge, a translucent pattern disc rotatably mounted to overlie one end of the housing, a light source to project a light beam through the pattern disc into one end of the housing, and shielding means adjacent the other end of the housing to close the space in front of the mirrors except for a relatively small opening intermediate the edges of the mirrors.

5. A kaleidoscopic projecting device comprising an elongated tubular housing, a pair of elongated mirrors in the housing meeting at an angle at one edge, a translucent pattern disc rotatably mounted to overlie one end of the housing, a light source to project a light beam through the pattern disc into one end of the housing, shielding means adjacent the other end of the housing to close the space in front of the mirrors except for a relatively small opening intermediate the edges of the mirrors, a tubular extension on the housing, and a lens in the extension having a lens opening substantially symmetrical about an axis parallel to the mirrors and concentric with said opening.

WILLIAM C. EDDY.

REFERENCES CITED

The following references are of record in the file of this patent:

UNITED STATES PATENTS

| Number | Name | Date |
| --- | --- | --- |
| 163,173 | Ferris et al. | May 11, 1875 |
| 1,449,122 | Marchand | Mar. 20, 1923 |
| 1,505,151 | Kunschmann | Aug. 19, 1924 |
| 1,914,562 | Freeland | June 20, 1933 |
| 1,990,867 | Harvey | Feb. 12, 1935 |
| 2,126,415 | Scheele | Aug. 9, 1938 |
| 2,297,767 | Hunt | Oct. 6, 1942 |

FOREIGN PATENTS

| Number | Country | Date |
| --- | --- | --- |
| 411,350 | Germany | Mar. 26, 1925 |
| 235,994 | Great Britain | July 2, 1925 |

Certificate of Correction

Patent No. 2,493,237                                                     January 3, 1950

WILLIAM C. EDDY

It is hereby certified that error appears in the printed specification of the above numbered patent requiring correction as follows:

Column 2, line 40, before "with" insert the words *are mounted*;

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*